(12) United States Patent
Shayegi et al.

(10) Patent No.: US 7,610,251 B2
(45) Date of Patent: Oct. 27, 2009

(54) WELL CONTROL SYSTEMS AND ASSOCIATED METHODS

(75) Inventors: Sara Shayegi, Houston, TX (US); Craig W. Godfrey, Dallas, TX (US); Dingding Chen, Plano, TX (US); Roger L. Schultz, Aubrey, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 301 days.

(21) Appl. No.: 11/333,768

(22) Filed: Jan. 17, 2006

(65) Prior Publication Data

US 2007/0168056 A1 Jul. 19, 2007

(51) Int. Cl.
G06E 1/00 (2006.01)
G06E 3/00 (2006.01)
G06G 7/00 (2006.01)

(52) U.S. Cl. ...................................................... 706/21

(58) Field of Classification Search .................. 706/15, 706/16, 46, 19
See application file for complete search history.

(56) References Cited

U.S. PATENT DOCUMENTS

| | | | |
|---|---|---|---|
| 3,552,502 A | 1/1971 | Wilson, Sr. | |
| 5,154,078 A | 10/1992 | Codazzi | |
| 5,303,582 A * | 4/1994 | Miska | 73/152.21 |
| 5,444,619 A | 8/1995 | Hoskins et al. | |
| 5,934,371 A * | 8/1999 | Bussear et al. | 166/53 |
| 6,002,985 A | 12/1999 | Stephenson | |
| 6,012,015 A | 1/2000 | Tubel | |
| 6,021,377 A | 2/2000 | Dubinsky et al. | |
| 6,035,952 A | 3/2000 | Bradfield | |
| 6,101,447 A | 8/2000 | Poe, Jr. | |
| 6,125,936 A * | 10/2000 | Swisher | 166/265 |
| 6,474,422 B2 | 11/2002 | Schubert et al. | |
| 6,585,044 B2 | 7/2003 | Rester | |
| 6,853,921 B2 | 2/2005 | Thomas et al. | |

(Continued)

FOREIGN PATENT DOCUMENTS

EP 0881357 12/1998

(Continued)

OTHER PUBLICATIONS

'Elements of artificial neural networks': Mehrotra, 1997, MIT Press, ISBN 0-262-13328-8.*

(Continued)

*Primary Examiner*—David R Vincent
*Assistant Examiner*—Peter Coughlan
(74) *Attorney, Agent, or Firm*—Marlin R. Smith; Smith IP Services, P.C.

(57) ABSTRACT

Well control systems and associated methods. A well control method includes the steps of drilling a wellbore and predicting a change in flow between the wellbore and a reservoir prior to the change occurring, the predicting step being performed, and the change in flow occurring while drilling. Another well control method includes the steps of: sensing at least one first drilling operation variable while drilling a wellbore, thereby generating first sensed variables; sensing at least one second drilling operation variable while drilling the wellbore, thereby generating second sensed variables; and training a predictive device, using the first and second sensed variables, to predict the second drilling operation variable at a selected time.

100 Claims, 9 Drawing Sheets

U.S. PATENT DOCUMENTS

| | | | |
|---|---|---|---|
| 6,901,391 | B2 | 5/2005 | Storm, Jr. et al. |
| 7,044,237 | B2 | 5/2006 | Leuchtenberg |
| 7,079,952 | B2 | 7/2006 | Thomas et al. |
| 2002/0112888 | A1 | 8/2002 | Leuchtenberg |
| 2003/0079912 | A1 | 5/2003 | Leuchtenberg |
| 2003/0110017 | A1* | 6/2003 | Guthrie et al. ................. 703/2 |
| 2005/0252286 | A1 | 11/2005 | Ibrahim |
| 2006/0100836 | A1* | 5/2006 | Singh .......................... 703/10 |

FOREIGN PATENT DOCUMENTS

WO   WO0206634   1/2002

OTHER PUBLICATIONS

'Theory of fuzzy information granulation: Contributions to interpretability issues', Mencar, 2004, University of Bari.*

International Search Report issued for International Patent Application No. PCT/US07/60001, dated Jul. 18, 2008, 3 pages.

Written Opinion issued for International Patent Application No. PCT/US07/60001, dated Jul. 18, 2008, 12 pages.

Kishan Mehrotra, et al., "Elements of Artificial Neural Networks," MIT Press, pp. 70-78, dated 1997.

Corrado Mencar, "Theory of Fuzzy Information Granulation: Contributions to Interpretability Issues," University of Bari, pp. 3-8,19, and 211-214, dated 2004.

International Preliminary Report on Patentability issued for International Patent Application No. PCT/US07/60001, dated Sep. 12, 2008, 14 pages.

Society of Petroleum Engineers publication No. 85310, dated Oct. 20-22, 2003.

Society of Petroleum Engineers publication No. 72058, dated May 25-26, 2001.

Shell, "Full-Scale Automated Choke Manifold," presentation dated Apr. 20, 2005.

Witold Pedrycz, "From Granular Computing to Computational Intelligence and Human-centric Systems," IEEE Computational Intelligence Society, May 2005, pp. 6-11.

@balance, "Dynamic Annular Pressure Control," undated.

Nils-Olav Skeie et al., "Early detection of Hydrocarbon liquid to surface during MPD operations," undated.

Press release, "Impact Solutions Group and Drilling Systems Team Up to Offer the Secure DrillingTM Managed Pressure Drilling System to the Industry," dated Oct. 21, 2004.

* cited by examiner

WELL CONTROL SYSTEMS AND ASSOCIATED METHODS

BACKGROUND

The present invention relates generally to operations performed and equipment utilized in conjunction with a subterranean well and, in an embodiment described herein, more particularly provides well control systems and associated methods.

Underbalanced drilling is a well drilling technique during which hydrostatic pressure of drilling fluid in a wellbore, plus any applied pressure, is less than a pore pressure in a zone of a formation being penetrated. At times, the pore pressure may be equal to or less than the combined hydrostatic and applied pressures, but in general the purpose is to prevent the drilling fluid from entering the formation, which could limit the future productivity of the formation.

During underbalanced drilling operations, various combinations of gasses, liquids and/or solids are injected into the wellbore and circulated to the surface. When the pore pressure is greater than the combined hydrostatic and applied pressures, fluid from the penetrated zones enters the wellbore and is produced to the surface along with the injected fluid. The fluid produced from the penetrated zones may include any combination of gas, water and oil.

To control the hydrostatic pressure at a penetrated zone, drilling operators typically vary the mixture of gasses, liquids, gels, foams and/or solids injected into the wellbore. To control the pressure applied to the wellbore, drilling operators typically adjust a choke at the surface to thereby regulate back pressure in the circulation of fluids through the wellbore. By controlling the hydrostatic and applied pressures, production of fluid from the penetrated zones may be controlled from the surface during drilling.

Unfortunately, these techniques do not permit an operator to anticipate a significant change in drilling conditions, such as a gas kick, so that surface controls can be adjusted accordingly. These techniques also do not permit an operator to anticipate how surface controls should be adjusted to account for changes in drilling activities, such as temporary cessation of actual drilling to connect another joint of drill pipe, etc.

Therefore, it may be seen that improvements are needed in well control systems and methods. These improvements would be of particular benefit in underbalanced drilling, as well as in other operations, such as managed pressure drilling.

SUMMARY

In carrying out the principles of the present invention, well control systems and methods are provided which solve at least one problem in the art. One example is described below in which a well control method permits a change in flow between a wellbore and a reservoir to be predicted before the change in flow occurs. Another example is described below in which different drilling states are provided for in a system incorporating multiple adaptive models.

In one aspect of the invention, a well control system and associated well control methods are provided in which drilling operation variables (such as a change in flow between a wellbore and a reservoir) may be readily predicted prior to the change occurring. The prediction may be made during drilling operations, so that the change which occurs during drilling operations can be conveniently predicted. A change in flow between the wellbore and the reservoir may occur after the prediction is made.

The change in flow may be, for example, an increased rate of fluid flow from the reservoir into the wellbore. Alternatively, the change in flow may be an increased rate of flow from the wellbore to the reservoir. The change in flow could result from a change in bottom hole pressure.

The predicting step may be performed by a predictive device. The predictive device may include a neural network, an artificial intelligence device, a floating point processing device, an adaptive model, a nonlinear function which generalizes for real systems and/or a genetic algorithm. The predictive device may perform a regression analysis, perform regression on a nonlinear function and may utilize granular computing. An output of a first principle model may be input to the adaptive model and/or a first principle model may be included in the adaptive model.

Terms or "weights" in the predictive device may be adjusted based on derivatives of output of the predictive device with respect to the terms. These derivatives would typically be used in an optimization process in which a cost function is either minimized or maximized.

The predictive device may be trained by inputting to the predictive device data obtained during the drilling operation. In addition, or instead, the predictive device may be trained by inputting to the predictive device data obtained while drilling at least one prior wellbore. The training may include inputting to the predictive device data indicative of past errors in predictions produced by the predictive device.

The drilling operation may be performed with an underbalanced condition in the wellbore. Alternatively, or in addition, a balanced condition and/or an overbalanced condition may exist in the wellbore.

The drilling operation may be performed while fluid flows from the reservoir into the wellbore. The drilling operation may include circulating fluid from the reservoir to a surface location.

In another aspect of the invention, the well control method could include the steps of: sensing a drilling operation variable while drilling a wellbore, thereby generating sensed variables; intermittently transmitting the sensed variables; and training a predictive device, using the sensed variables, to predict a value of the drilling operation variable occurring between transmissions of the sensed variables.

In yet another aspect of the invention, the well control method could include the steps of: sensing at least one first drilling operation variable while drilling a wellbore, thereby generating a first set of sensed variables; sensing at least one second drilling operation variable while drilling the wellbore, thereby generating a second set of sensed variables; and training a predictive device, using the first and second sensed variable sets, to predict the second drilling operation variable at a selected time.

In a further aspect of the invention, the well control method practiced according to the principles of the invention could also include the steps of: sensing at least one first drilling operation variable while drilling one wellbore, thereby generating a first set of sensed variables; sensing at least one second drilling operation variable while drilling another wellbore, thereby generating a second set of sensed variables; and training a predictive device, using the first and second sensed variable sets, to predict the second drilling operation variable at a selected time.

The trained predictive device may be utilized to predict the second drilling operation variable at the selected time when the second sensed variable is unavailable. The selected time may be a time when the first sensed variable is available, but the second sensed variable is unavailable.

These and other features, advantages, benefits and objects of the present invention will become apparent to one of ordinary skill in the art upon careful consideration of the detailed description of representative embodiments of the invention hereinbelow and the accompanying drawings, in which similar elements are indicated in the various figures using the same reference numbers.

DETAILED DESCRIPTION

It is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which is not limited to any specific details of these embodiments.

In the following description of the representative embodiments of the invention, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore.

Figure 1:
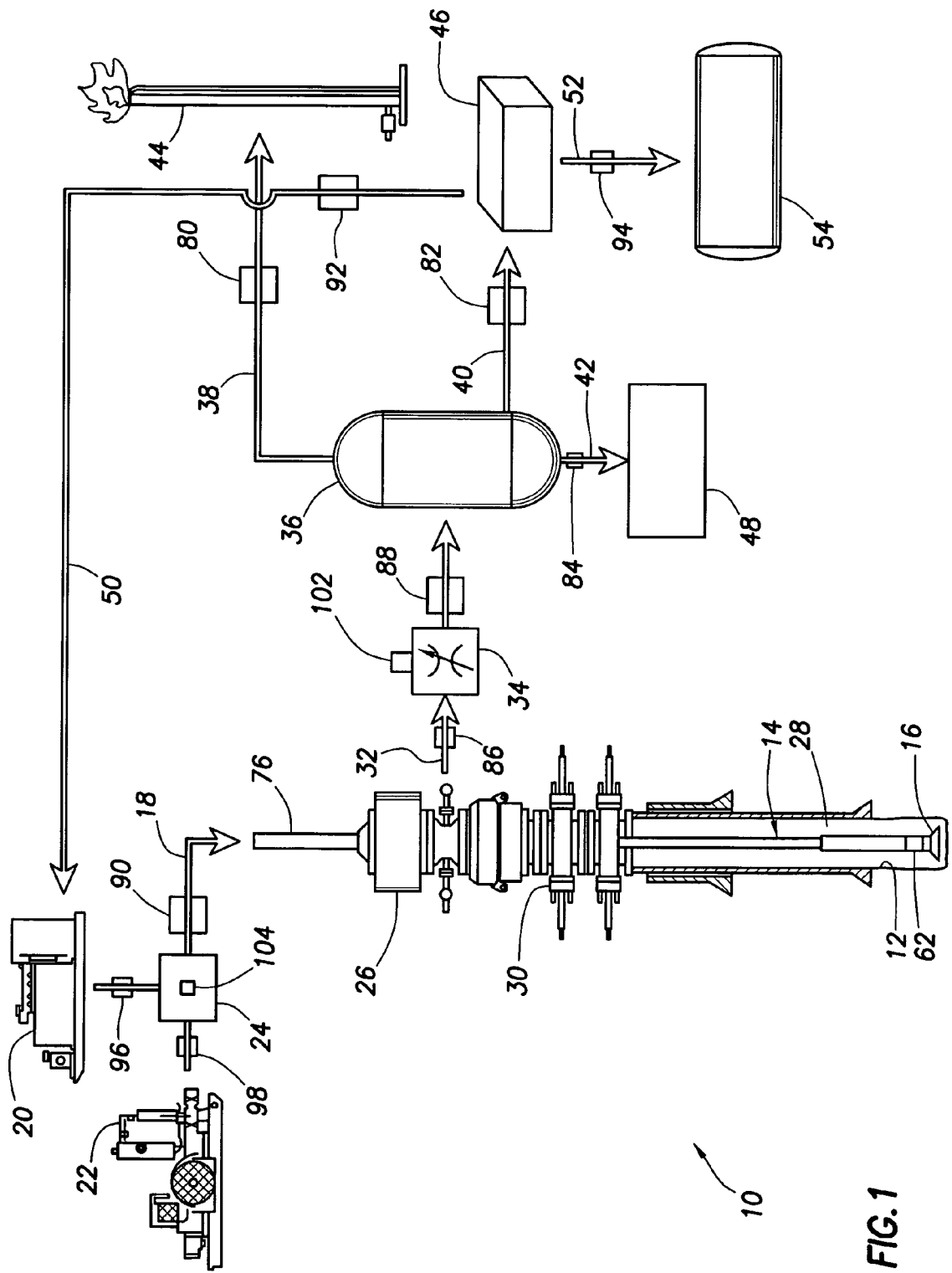
FIG. 1 is a schematic view of a well control system embodying principles of the present invention.

Representatively illustrated in FIG. 1 is a well control system 10 which embodies principles of the present invention. In the system 10, a wellbore 12 is drilled in an underbalanced condition. Certain specialized equipment, described more fully below, is used to maintain the underbalanced condition and otherwise control the drilling operation.

Although the system 10 is described herein as being used for underbalanced drilling, it should be understood that overbalanced and at balance operations could also or instead be performed in keeping with the principles of the invention. A drill string 14 in the method 10 could include multiple drill pipe segments or joints, or the drill string could include continuous non-jointed pipe, such as coiled tubing. The drill string 14 could be rotated, or the drill string could include a drilling motor, which could rotate a drill bit 16 in response to circulation of fluid through the drill string. Fluid may be injected into the wellbore 12 via the drill string 14 and/or through an outer concentric casing string or a "parasite" injection string. The wellbore 12 could be drilled in any direction or combination of vertical, horizontal and inclined directions. The well could be a gas well, oil well, geothermal well or any other type of well, and the well may be intended for production or injection of any fluid or combination of fluids. Thus, it should be clearly understood that the invention is not limited in any manner to the details of the system 10 or any other examples of the invention described herein.

As depicted in FIG. 1, injection fluid 18 is delivered into the wellbore 12 through the drill string 14. At the surface, a rig pump 20 may be used to pump liquids and a gas compressor 22 may be used to pump gasses. The liquid and gas components of the injection fluid 18 are combined at a manifold 24. Solids, gels, foams and any other type of substance may be mixed with the injection fluid 18, as well.

The mixture of fluids, etc. in the injection fluid 18 may be varied to thereby vary hydrostatic pressure in the wellbore 12. For example, a density of the injection fluid 18 could be increased to cause an increase in hydrostatic pressure in the wellbore, or additional gas or foam could be included in the injection fluid to decrease the hydrostatic pressure.

A rotating pressure control device (RCD) 26 allows pressure containment in the wellbore 12 by closing off the annulus 28 between the wellbore and the drill string 14, while still permitting the drill string to advance into the wellbore. The RCD 26 is positioned above blowout preventers (BOP's) 30 at the surface. Fluid 32 circulated out of the wellbore 12 exits between the BOP's 30 and the RCD 26.

The fluid 32 flows through a choke 34 after exiting the wellbore 12. A restriction to flow through the choke 34 can be varied to thereby vary backpressure in the wellbore 12. That is, a pressure differential across the choke 34 is changed when needed to cause a corresponding change in pressure applied to the wellbore 12.

Downstream of the choke 34, the fluid 32 enters a separator 36. Gas 38, liquid 40 and solid 42 portions of the fluid 32 are separated from each other in the separator 36. The gas portion 38 may be directed to a flare 44 or other disposal or recycling facility.

The liquid portion 40 may be directed to a settling tank 46 for further separation of liquids and solids. Liquids 50 which can be reused in the drilling operation may be flowed back to the rig pump 20. Other liquids 52 may be directed to a storage or disposal facility 54. The solid portion 42 may be directed to a disposal facility 48.

It will be appreciated that the system 10 could include many other items of equipment not illustrated in FIG. 1, or equipment different from that illustrated in FIG. 1. Thus, it should be understood that FIG. 1 is only a simple schematic representation of the system 10, which may in practice be far more complex and include features not depicted in FIG. 1.

Figure 2:
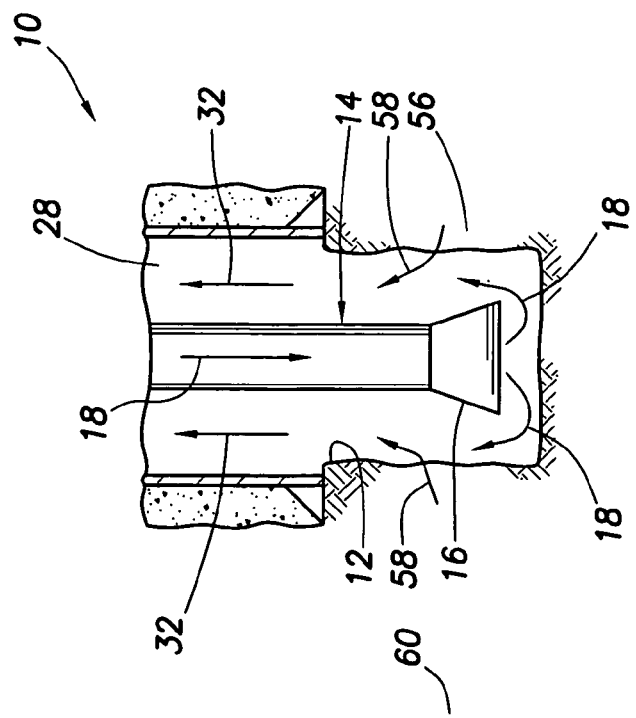
FIG. 2 is an enlarged partially cross-sectional schematic view of a drill string and a zone being penetrated thereby in the system of FIG. 1.

Referring additionally now to FIG. 2, an enlarged view of a lower end of the wellbore 12 and drill string 14 is representatively illustrated. In this view it may be seen that the drill bit 16 is penetrating a formation zone 56. The injection fluid 18 exits the drill bit 16 at the lower end of the drill string 14 and circulates back to the surface via the annulus 28.

In underbalanced drilling, it is desired to maintain the pressure in the wellbore 12 so that reservoir fluid 58 enters the wellbore as the wellbore is being drilled. That is, pressure in the wellbore 12 should be somewhat less than pore pressure in the zone 56. The fluid 58 is from a reservoir 60 which communicates with the wellbore via the zone 56. The fluid 58 flows into the wellbore 12 from the zone 56 under the influence of the pressure differential between the wellbore and zone.

The reservoir fluid 58 mixes with the injection fluid 18, and the combined fluids 32 circulate to the surface through the annulus 28. At times, pressure in the wellbore 12 may be approximately equal to pore pressure in the zone 56 (known as an "at balance" condition), in which case there is no significant fluid transfer between the wellbore and the zone, and the fluid 32 includes substantially exclusively the injection fluid 18.

At other times, pressure in the wellbore 12 may be greater than pore pressure in the zone 56 (known as an "overbalanced" condition), in which case a portion of the injection fluid 18 flows into the zone 56, and the fluid 32 includes substantially exclusively the remaining injection fluid. To prevent damage to the zone 56, the overbalanced condition is to be avoided in the system 10.

However, note that in other embodiments of the invention, or periodically in the system 10, it may be desired to maintain an overbalanced condition. For example, while tripping the drill string 14 into and out of the wellbore 12 (e.g., to change the drill bit 16), it may be useful to maintain an overbalanced condition in the wellbore.

In order to maintain a desired underbalanced, balanced or overbalanced condition in the wellbore 12, it is very useful to know what the pressure is in the wellbore. For this purpose, the drill string 14 may include a pressure sensor located, for example, near the lower end of the drill string. As depicted in FIG. 1, the drill string 14 includes a sensor and telemetry device 62.

The device 62 may be of the type capable of sensing drilling operation variables such as pressure, temperature, flow rate, weight on bit, rotation speed, etc. Advanced sensors in the device 62 could be capable of measuring multiphase flow rates and fluid properties (such as resistivity, conductivity, density, etc.) internal and/or external to the drill string 14. The device 62 may also be of the type capable of transmitting indications of such drilling operation variables to the surface via telemetry, such as mud pulse, acoustic, electromagnetic or other type of telemetry.

In this manner, an operator at the surface can be informed of conditions in the wellbore 12 near the lower end of the drill string 14. Unfortunately, some forms of telemetry (such as mud pulse telemetry) have relatively low bandwidth, or transmission of the drilling variable measurements may be intermittent, so that the operator is not continuously informed of downhole conditions. As described more fully below, the system 10 can include features which permit the drilling variable measurements to be accurately estimated, even though communication with the device 62 may be intermittent, low bandwidth, unreliable, etc.

The system 10 can also include features which permit the flow rate and any change in flow rate of fluid transfer between the wellbore 12 and zone 56 to be predicted. Other drilling operation variables, such as composition of the fluid 32, rate of penetration through the zone 56, etc. can also be predicted. The drilling operation variables can be optimized to produce, for example, a maximum rate of penetration or a maximum net present economic value of the well, as described more fully below.

Figure 3:
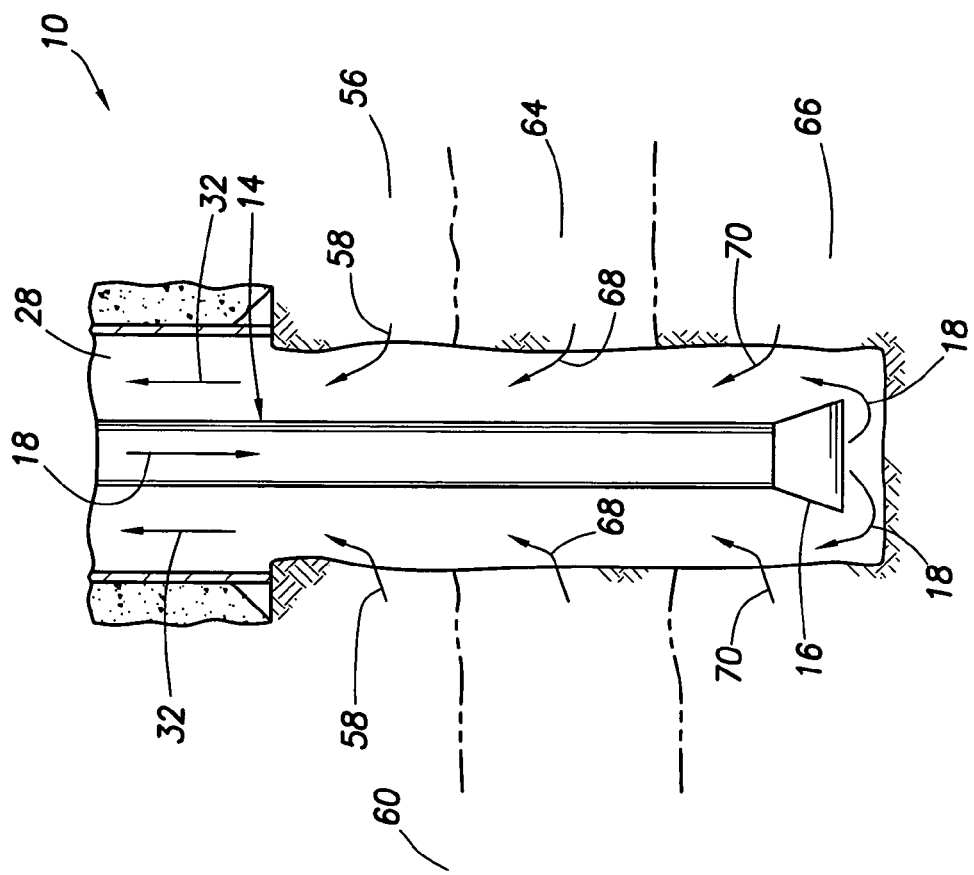
FIG. 3 is a partially cross-sectional schematic view of the drill string penetrating multiple zones in the system of FIG. 1.

Referring additionally now to FIG. 3, the system 10 is depicted after the drill string 14 and wellbore 12 have penetrated additional zones 64, 66. With an underbalanced condition, reservoir fluids 68, 70 flow into the wellbore 12 from the respective zones 64, 66 as they are penetrated in succession. Either or both of the reservoir fluids 68, 70 could originate from the same reservoir 60 as the fluid 58, or they could originate from different reservoirs. In addition, the zones 56, 64, 66 could be adjacent one another as depicted in FIG. 3, or they could be spaced apart, separated by additional zones or formations, etc.

It will be appreciated that the existence of the multiple zones 56, 64, 66 and the associated multiple fluid transfer locations complicates the problem of estimating and predicting downhole conditions in the system 10. For example, if one or more of the zones 56, 64, 66 has a different permeability than the other of the zones, fluid transfer between that zone and the wellbore 12 will be different for a given pressure differential between the zone and the wellbore. As another example, it is possible for an overbalanced condition to exist with respect to one of the zones 56, 64, 66, while a balanced condition exists with respect to another zone and an underbalanced condition exists with respect to yet another zone.

The system 10 can include features which permit a flow rate between the wellbore 12 and the zone 66 being penetrated to be estimated and/or predicted, even though there is also fluid transfer between the wellbore and the other zones 56, 64. In addition, as described more fully below, the system 10 can include features which permit various other drilling operation variables to be estimated and/or predicted in complex circumstances, such as those depicted in FIG. 3.

Figure 4:
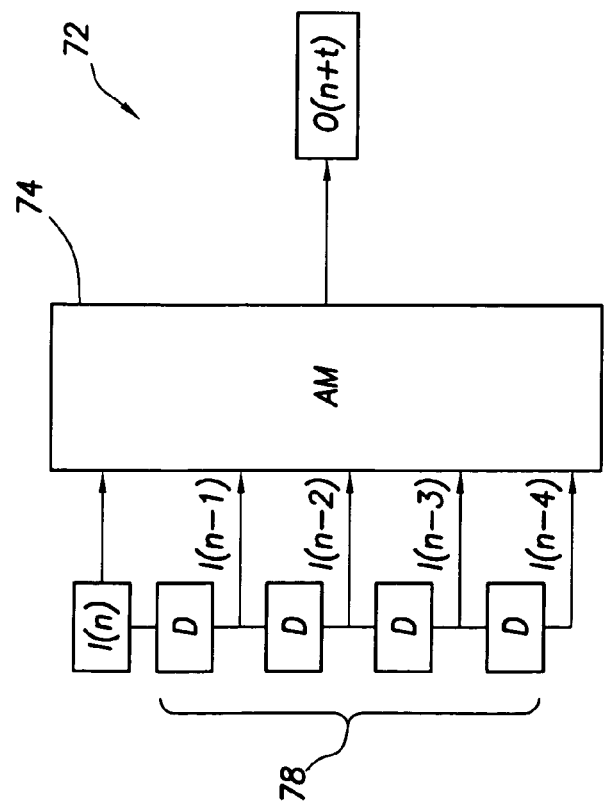

Referring additionally now to FIG. 4, a predictive device 72 is representatively and schematically illustrated. The predictive device 72 includes an adaptive model 74 for estimating and/or predicting drilling operation variables O in the system 10. In the illustration, I(n) designates a set of drilling operation input variables at a time index n.

The input and output drilling operation variables I, O may be any of the variables discussed above, including but not limited to various pressures (such as pressure in the annulus 28 below the BOP's 30, pressure in a standpipe 76, gas injection pressure, pressure in the separator 36, differential pressure across the choke 34, bottom hole pressure, etc.), various temperatures (such as temperature in the separator 36, temperature upstream of the choke 34, temperature in the standpipe 76, bottom hole temperature, etc.), various flow rates (such as gas injection rate, liquid injection rate, gas production rate, liquid production rate, solids production rate, etc.), various control inputs (such as position of the choke 34, configuration of the manifold 24, etc.), flow coefficient Cv of the choke, true vertical depth at the drill bit 16, drilling state or activity type (such as drilling, circulating, making connections, tripping in or out, etc.), rate of penetration, properties of the various fluids and solids 18, 32, 38, 40, 42, 50, 52 (such as density, viscosity, etc.), a rate of flow between the wellbore 12 and the reservoir 60, a change in flow between the wellbore and the reservoir (such as an increased rate of flow from the reservoir into the wellbore), and any other significant drilling operation variables or combination of variables.

Note that a drilling operation variable could also relate to production from the well and/or injection into the reservoir 60. For example, during drilling operations certain tests may be performed, such as formation tests, interference tests, flow tests, etc. Thus, drilling operation variables can include production and/or injection variables (such as rate of flow from the reservoir 60 to the wellbore 12, pressure change in the reservoir at locations intersected by multiple wellbores, etc.).

The adaptive model 74 may include a neural network, fuzzy logic, a genetic algorithm, an artificial intelligence device, a first principle model, or any other type of adaptive model, and any combination of these. The adaptive model 74 may include a floating point processing device. The adaptive model 74 may perform a regression analysis, utilize a nonlinear function which generalizes for real systems, utilize granular computing and/or perform regression on a nonlinear function.

As well known to those skilled in the art, granular computing is an emerging computing paradigm of information processing. It concerns processing of complex information entities called "information granules", which arise in the process of abstraction of data and derivation of knowledge from information; this process is called information granulation. Generally speaking, information granules are collections of entities, usually originating at the numeric level, that are arranged together due to their similarity, functional adjacency, indistinguishability, coherency or the like.

Granular computing can be conceived as a category of theories, methodologies, techniques and tools that make use of information granules in the process of problem solving. In this sense, granular computing is used as an umbrella term to cover these topics that have been studied in various fields in isolation. By examining all of these existing studies in light of the unified framework of granular computing and extracting their commonalities, it is possible to develop a general theory for problem solving.

Granular computing can be used to describe a way of computing that is similar in some ways to the human ability to perceive the real world under various levels of granularity, in order to abstract and consider only those things that serve a specific interest, and to switch among different granularities. By focusing on different levels of granularities, one can obtain different levels of knowledge, as well as a greater understanding of inherent knowledge structure. Granular computing is thus essential in human problem solving and hence has a very significant impact on the design and implementation of intelligent systems.

Further information regarding granular computing may be found in Bargiela, A. and Pedrycz, W., *Granular Computing, An Introduction*, Kluwer Academic Publishers (2003); Zadeh, L. A., "Toward a Theory of Fuzzy Information Granulation and its Centrality in Human Reasoning and Fuzzy Logic," *Fuzzy Sets and Systems*, 90:11-127 (1997); and W. Pedrycz, *From Granular Computing to Computational Intelligence and Human-centric Systems*, IEEE Computational Intelligence Society (May 2005). The entire disclosures of these reference documents are incorporated herein by this reference.

In the predictive device 72 depicted in FIG. 4, the adaptive model 74 preferably includes a neural network. The drilling operation variables I at time index n are input to the neural network. In addition, the drilling operation variables I at previous time indices n−1, n−2, n−3 and n−4 are also input to the neural network. The concurrent input of data at multiple present and past time indices with delays D is known to those skilled in the neural network art as a tapped delay line 78. Any delay time length and number of delays D may be used.

The neural network outputs a prediction of the drilling operation variables O at a future time index of n+t. In order to accomplish this goal, the neural network is trained with known drilling operation variables using training techniques known to those skilled in the art. When properly trained, the neural network is capable of predicting future drilling operation variables O in response to input of known drilling operation variables I to the neural network. The input variables I and the output variables O may be any of the variables described herein, or any combination thereof, and it is not necessary for the input variables I to be the same as the output variables O.

In the system 10, an operator may wish to be provided with a prediction of the bottom hole pressure, for example, fifteen minutes in the future, so that appropriate preparations may be made to adjust the bottom hole pressure as needed. The neural network of the adaptive model 74 can be trained using previously recorded sets of drilling operation variables (which could include bottom hole pressures measured, for example, using the device 62). Once trained, the neural network can predict future drilling operation variables, such as bottom hole pressure. In this manner, the operator can be forewarned if any adjustments need to be made to the bottom hole pressure by, for example, adjusting the hydrostatic pressure in the wellbore 12 and/or adjusting the applied pressure in the wellbore.

Another significant variable in underbalanced drilling operations is produced gas rate (PGR). If the PGR is excessive, a large volume of gas may accumulate in the separator 36, perhaps permitting gas to escape to the settling tanks 46 and creating a hazardous situation. An operator may wish to be provided with a prediction of PGR so that, in case of a predicted excessive PGR, actions may be taken to reduce the PGR (for example, by increasing the restriction to flow through the choke 34, etc.).

As described above for the bottom hole pressure variable, the neural network of the adaptive model 74 can be trained using previously recorded sets of drilling operation variables (which could include PGR's measured, for example, using a flowmeter 80 as depicted in FIG. 1 to detect a flow rate of the gas 38). Once trained, the neural network can predict future drilling operation variables, such as PGR. In this manner, the operator can be forewarned if any adjustments need to be made to the PGR by, for example, adjusting the hydrostatic pressure in the wellbore 12 and/or adjusting the applied pressure in the wellbore.

In a similar manner, produced liquid rate (PLR) can be sensed using a flowmeter 82 to detect a flow rate of the liquid 40, produced solids rate (PSR) can be sensed using a sensor 84 to sense the mass flow rate of the solids 42, sensors 86, 88 may be used to measure flow rate, pressure and temperature upstream and downstream of the choke 34, pressure differential across the choke, etc., a flowmeter 90 may be used to detect a flow rate of the injection fluid 18, flowmeters 92, 94 may be used to detect flow rates of the liquids 50, 52, a sensor 102 may be used to detect a position of the choke, a sensor 104 may be used to detect a configuration of the manifold 24, flowmeters 96, 98 may be used to separately detect flow rates of the injected liquids and gasses, etc. Any of these sensors could also include pressure and/or temperature and/or any other type or combination of sensors.

It should be clearly understood that any significant variable or combination of variables in the system 10 can be measured and used to train the neural network in the adaptive model 74, so that any of the variables or combination of the variables can be predicted in the future. This allows the operator time to evaluate what corrective actions, if any, need to be taken, so that undesirable situations (such as an overbalanced condition downhole) can be avoided.

As will be appreciated by those skilled in the adaptive model art, estimates or predictions of variables will be most accurate if the model is trained using data collected under circumstances which are similar to the circumstances at the point in time when the estimate of the variable is made, or the future point in time when the variable is predicted.

Note that it is not necessary for all of the variables used to train the neural network to be obtained while drilling the same wellbore. For example, experience obtained while drilling another wellbore in the same field or into the same reservoir could be used to train the adaptive model 74 for use in a subsequent wellbore drilling operation. Pressure gradient is an example of a variable that could be useful in training a neural network to predict drilling operation variables for a subsequent wellbore.

Again, those skilled in the adaptive model art will recognize that data collected from experience with a first wellbore may be used with an adaptive model to more accurately produce estimates or predictions of variables for a second wellbore if the model is trained using data from the first wellbore collected under circumstances which are similar to the circumstances at the point in time when the estimate of the variable is made, or the future point in time when the variable is predicted, for the second wellbore. For example, the data collected for the first wellbore and used to train a neural network of an adaptive model for a second wellbore could be for a similar depth and/or a similar type of zone or formation being penetrated. Multiple adaptive models could be used, with each being adapted for a particular set of circumstances encountered in the drilling operation.

Thus, a well control method practiced according to the principles of the invention could include the steps of: sensing at least one first drilling operation variable while drilling one wellbore, thereby generating a first set of sensed variables; sensing at least one second drilling operation variable while drilling another wellbore, thereby generating a second set of sensed variables; and training a predictive device, using the first and second sensed variable sets, to predict the second drilling operation variable at a selected future time.

Figure 5:
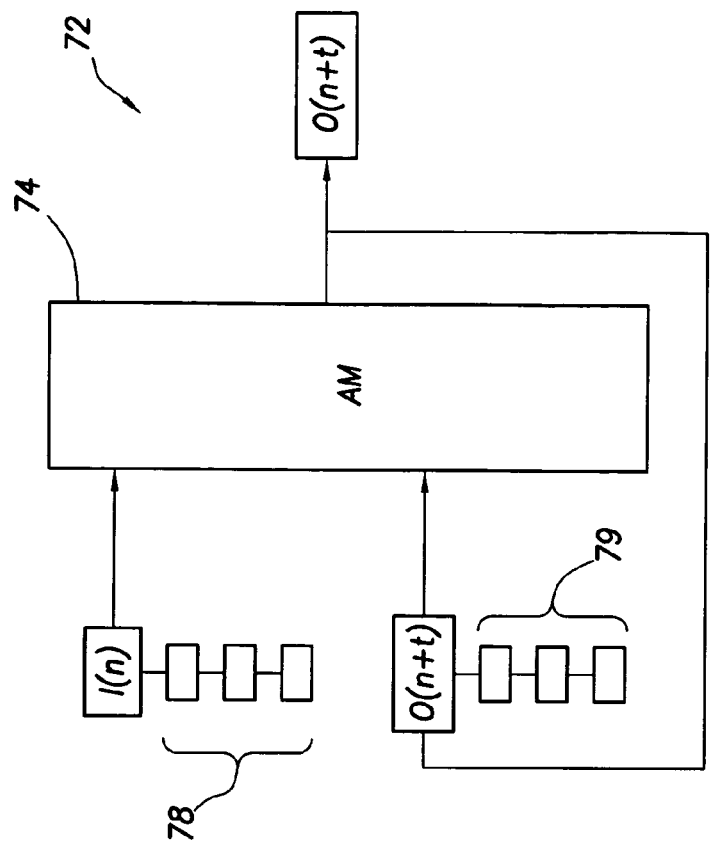
FIGS. 4-17 are schematic views of methods of utilizing predictive devices in the system of FIG. 1.

Referring additionally now to FIG. 5, the predictive device 72 is schematically illustrated in another configuration in which the variables O predicted at time index n+t are input to the adaptive model 74 along with the variables I at time index n and the associated tapped delay line 78. This configuration may provide enhanced learning in the neural network and result in more accurate predictions of future variables. Note that a tapped delay line 79 may also be used for the input of the predicted variables O. Thus, it will be appreciated that any of a variety of techniques known to those skilled in the art for training neural networks and using neural networks to predict future events (including techniques not specifically described herein) may be utilized in keeping with the principles of the invention.

Figure 6:
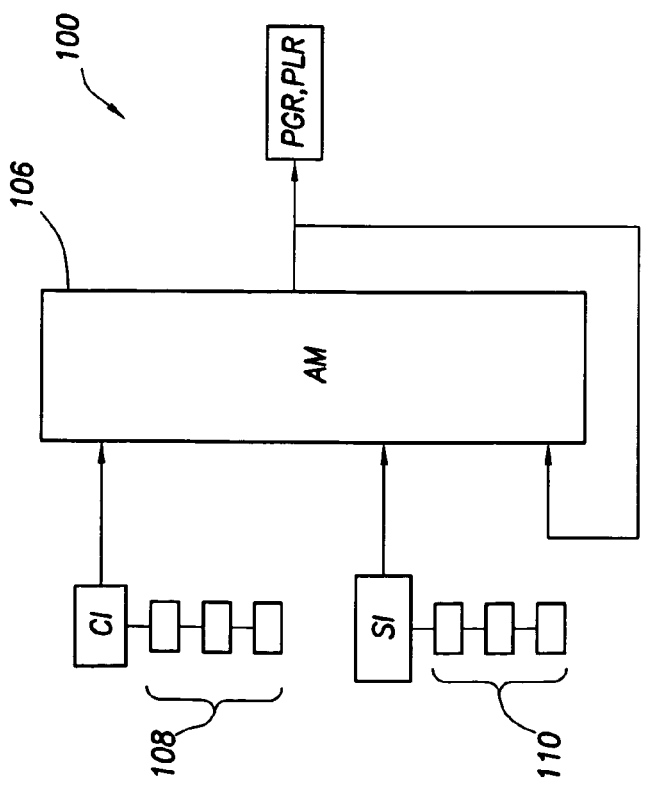

Referring additionally now to FIG. 6, another predictive device 100 which may be used in the system 10 is schematically and representatively illustrated. The predictive device 100 includes an adaptive model 106 which may be similar in one or more respects to the adaptive model 74 described above. Preferably, in the predictive device 100 the adaptive model 106 includes a neural network, but other types of adaptive models could be used in keeping with the principles of the invention.

The neural network is trained using input variables CI and SI representing control inputs and system inputs, respectively. In addition, each input variable has a respective tapped delay line 108, 110 input to the neural network. The CI variables are of the type which may be directly controlled, such as position of the choke 34, configuration of the manifold 24, activity type, etc. The SI variables are of the type which describe system characteristics, such as pressure differential across the choke 34, pressure, temperature and flow rate at various points in the system 10, etc. Any of the drilling operation variables described above and any combination of these may be used as the CI or SI variables.

The neural network is trained to predict PGR and PLR (produced gas and liquid rates, respectively). In addition, the predicted PGR and PLR are used as inputs to the neural network, along with associated tapped delay lines, if desired (similar to the manner in which O(n+t) and associated tapped delay line 79 are input to the neural network as depicted in FIG. 5). As with the predictive device 72 described above, the predictive device 100 provides the operator with advance warning in the event that corrections or adjustments need to be made to modify the PGR or PLR in the system 10.

Figure 7:
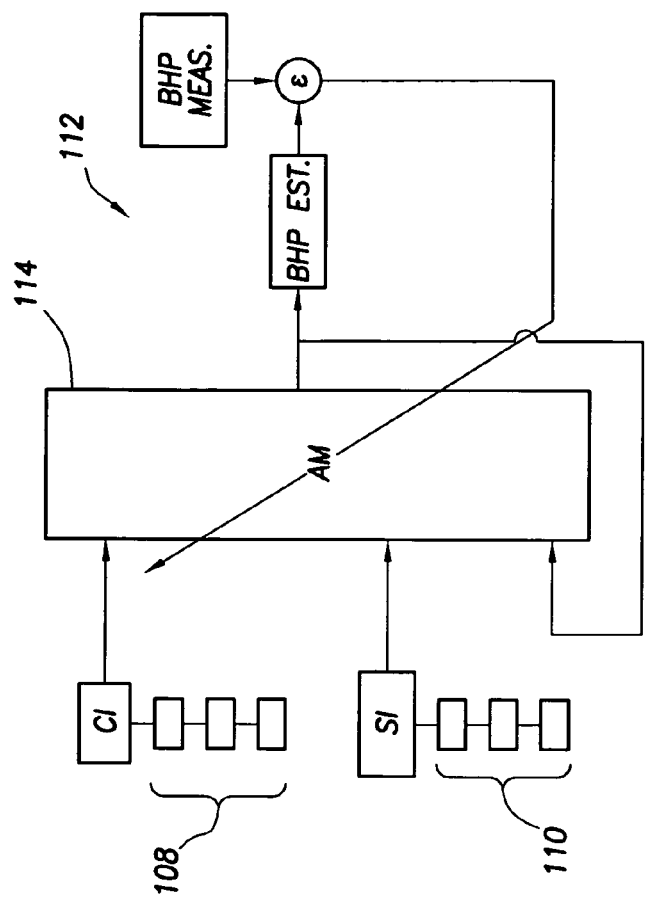

Referring additionally now to FIG. 7, another predictive device 112 which may be used in the system 10 is schematically and representatively illustrated. The predictive device 112 includes an adaptive model 114, which may be similar in one or more respects to the adaptive models 74, 106 described above. Preferably, in the predictive device 112 the adaptive model 114 includes a neural network, but other types of adaptive models could be used in keeping with the principles of the invention.

The neural network is trained using the input variables CI and SI. In addition, the tapped delay lines 108, 110 are input to the neural network. Once trained, the neural network outputs an estimate of the bottom hole pressure BHP. The training may include adjusting terms in the neural network (typically referred to as "weights"), based on derivatives of the neural network output with respect to the terms.

The estimated bottom hole pressure output is useful in those circumstances where a direct measurement of bottom hole pressure is not available. For example, if the device 62 only transmits measurements of the bottom hole pressure to the surface once every ten minutes, but an indication of bottom hole pressure is desired every minute, the adaptive model 114 can provide estimations of the bottom hole pressure between the transmissions of actual measurements.

Another circumstance in which the predictive device 112 may be useful is when the device 62 is prevented from transmitting measurements of the bottom hole pressure, either temporarily or permanently, due to a malfunction, loss of circulation or other cause. Past measurements of bottom hole pressure (along with the CI and SI variables) may be used to train the neural network to estimate the bottom hole pressure while the device 62 is not able to transmit actual measurements of the bottom hole pressure.

When actual measurements of the bottom hole pressure are available, these actual measurements (depicted as BHP meas. in FIG. 7) are compared to the estimated bottom hole pressure (depicted as BHP est. in FIG. 7), and any error or discrepancy (depicted as $\epsilon$ in FIG. 7) is used to adjust the neural network (e.g., adjust the terms or "weights" in the neural network), in order to improve the accuracy of future estimates. The BHP est. may also be input to the neural network, along with an associated tapped delay line if desired, as shown in FIG. 7.

The BHP est. output by the adaptive model 114 may be used in any of the other predictive devices described herein where the BHP is used as an input to an adaptive model but a measured BHP is not continuously available. In addition, although the predictive device 112 is described above as being used to estimate BHP, any of the other drilling operation variables described herein could also or instead be estimated in keeping with the principles of the invention using similar techniques. Furthermore, the training and estimating or predicting techniques described above may be used for any of the other adaptive models described herein.

Figure 8:
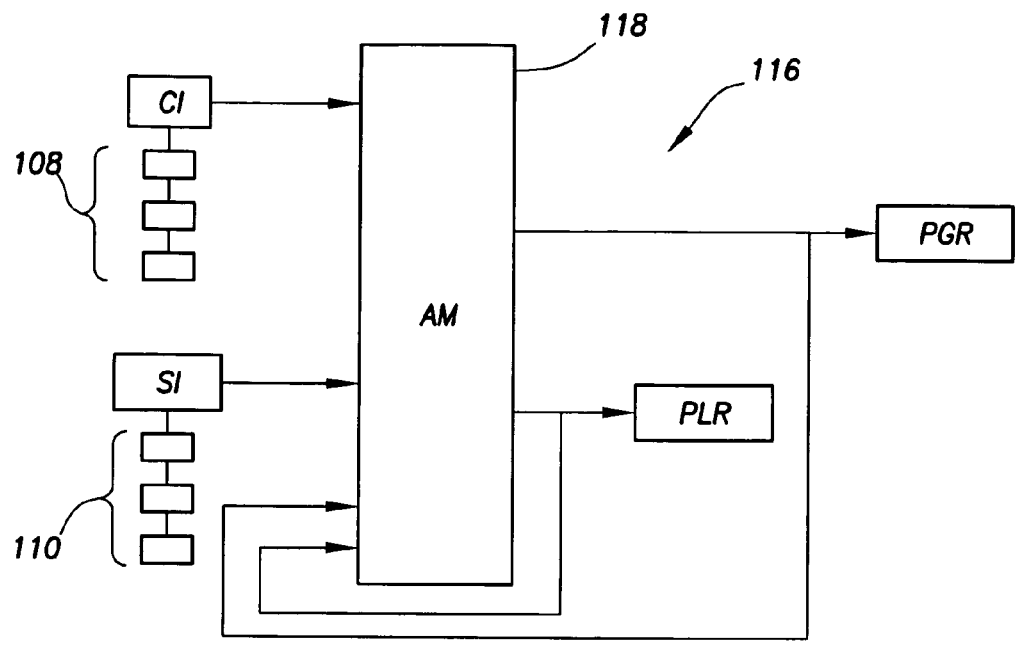

Referring additionally now to FIG. 8, another predictive device 116 which may be used in the system 10 is schematically and representatively illustrated. The predictive device 116 includes an adaptive model 118, which may be similar in one or more respects to the adaptive models 74, 106, 114 described above. Preferably, in the predictive device 116 the adaptive model 118 includes a neural network, but other types of adaptive models could be used in keeping with the principles of the invention.

The neural network is trained using the input variables CI and SI. In addition, the tapped delay lines 108, 110 are input to the neural network. Once trained, the neural network outputs a prediction of each of the PGR and PLR. The predicted PGR and PLR may also be input to the neural network, along with associated respective tapped delay lines, if desired.

Note that the predictive device 116 is similar in many respects to the predictive device 100 described above. However, the predictive device 116 is for use in a certain activity type during drilling operations in the system 10. In this example, the predictive device 116 is used for modeling the system 10 during the periods when connections are made in the drill string 14.

When using jointed pipe in the drill string 14, actual drilling must be temporarily stopped periodically while another joint of pipe is added to the drill string. It will be appreciated that this is a significant change in the circumstances of the drilling operation, and a model used to predict variables such as PGR and PLR during actual drilling may be inappropriate for predicting these same variables while connections are being made in the drill string 14.

Thus, the predictive device 100 of FIG. 6 could be used in the system 10 to predict PGR and PLR during actual drilling, and the predictive device 116 could be used in the system to predict PGR and PLR while connections are being made. The differences in the adaptive models 106, 118 result at least in part from how they are trained and which of the drilling variable inputs are used for each. For example, the input variables CI, SI used to train the neural network of the adaptive model 106 are taken during actual drilling, while the input variables CI, SI used to train the neural network of the adaptive model 118 are taken while connections are being made in the drill string 14. The input variables used with the adaptive model 106 may include weight on bit WOB and rotational speed RPM of the bit, while these variables would not be used with the adaptive model 118.

Additional predictive devices may be used to model other significant circumstances in the drilling operation, in order to more accurately predict certain variables in those different circumstances. For example, a separate predictive device may be used to predict variables during circulation (i.e., when actual drilling is not taking place and a connection is not being made, but fluid is being circulated through the wellbore 12), during tripping the drill string 14 in or out of the wellbore, when a significant control input is changed (e.g., the position of the choke 34 is changed), etc. Other circumstances may be modeled using other predictive devices in keeping with the principles of the invention.

Thus, multiple predictive devices may be used in the system 10, with each predictive device being tailored for a particular activity type or situation in the drilling operation. Although each of the predictive devices 100, 116 described above is used to predict PGR and PLR, other variables and other combinations of variables, including any of the drilling operation variables described above, may be predicted in keeping with the principles of the invention.

Another unique situation is presented in drilling operations when there is a change between activity types or other circumstances. For example, during the activity of making a connection in the drill string 14, gas may accumulate and rise in the annulus 28 so that, after the connection is made and circulation resumes accompanying continued drilling, a substantially increased PGR or "gas kick" may occur at the surface. This transient phenomenon may not be predicted by the predictive device 100 (which is trained to model the system 10 during drilling activity) or the predictive device 116 (which is trained to model the system 10 during connection activity).

Figure 9:
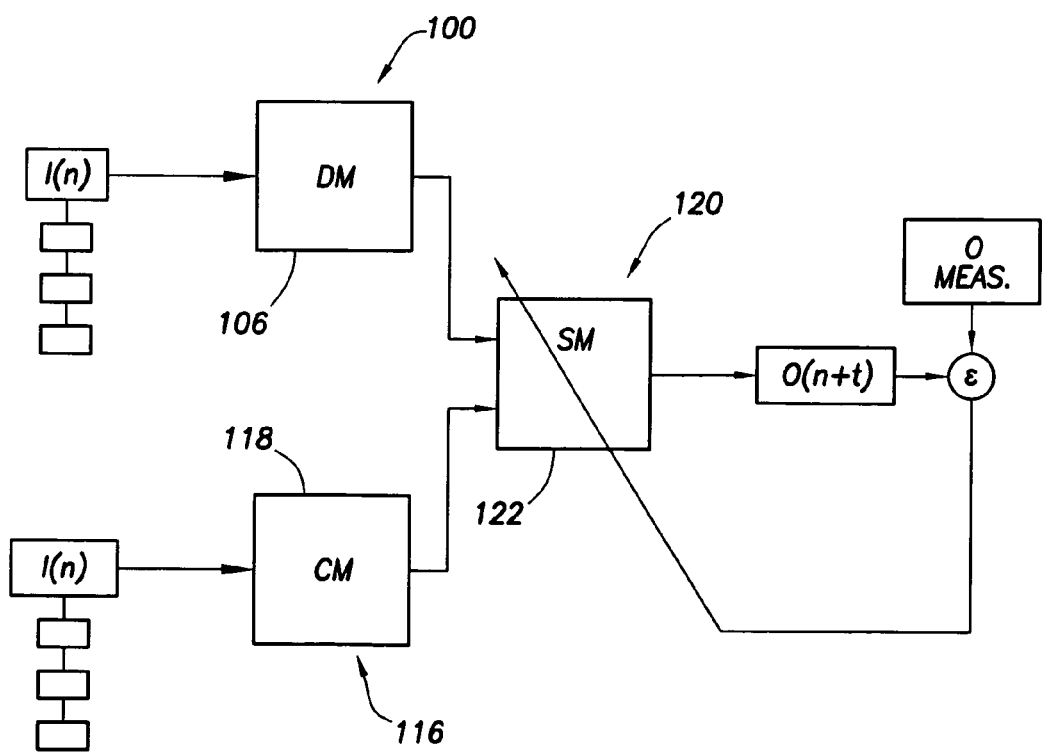

Referring additionally now to FIG. 9, the predictive device 110 is represented with the adaptive model 106 having been trained as a drilling activity model, and the predictive model 116 is represented with the adaptive model 118 having been trained as a connection activity model. Various variables I are input to the drilling and connection models in order to predict certain variables in the future.

However, note that in the configuration depicted in FIG. 9, the outputs of the drilling and connections models are input to another predictive device 120. The predictive device 120 includes an adaptive model 122 which is trained to model a situation in which one or more transient phenomena occur. In the FIG. 9 configuration, the adaptive model 122 is trained to predict the variables O at future time index n+t when the activity type changes between actual drilling and making connections.

Actual measurements of the variables (depicted in FIG. 9 as O meas.) may be compared to the predicted variables, and any error or discrepancy (depicted in FIG. 9 as $\epsilon$) can be used to adjust or modify the model 122 to thereby improve future predictions.

In operation, the model 106 would be used to predict the variables O during actual drilling, and the model 118 would be used to predict the variables O while connections are made in the drill string 14. However, when the activity changes from one to the other, the model 122 would be used to predict the variables O, including any transient phenomena, which may occur following the activity change.

Figure 10:
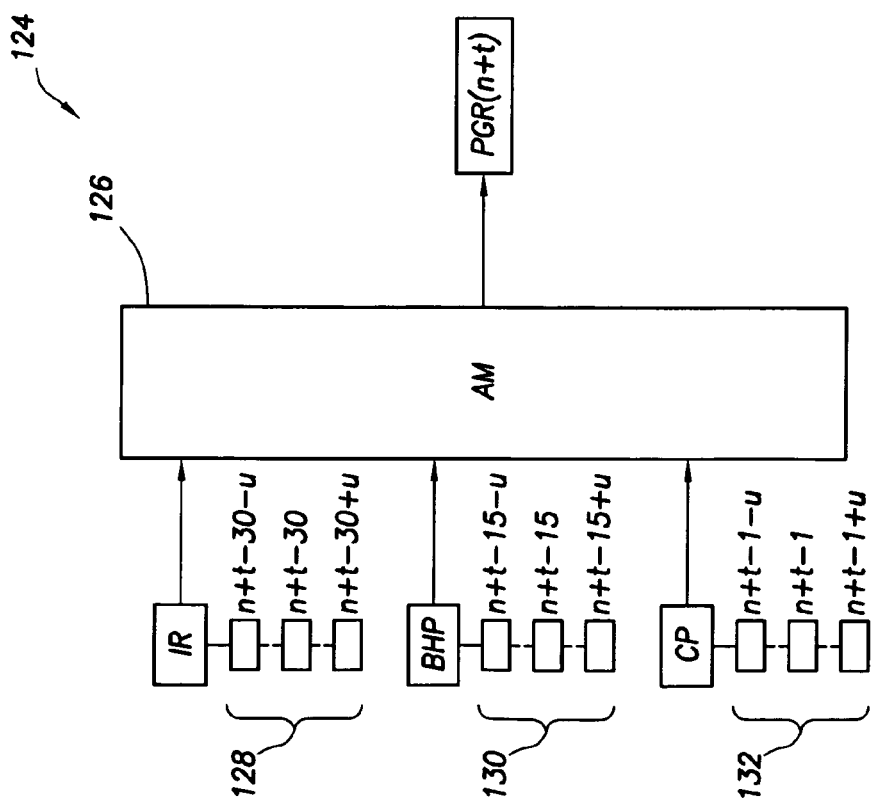

Referring additionally now to FIG. 10, another predictive device 124 which may be used in the system 10 is schematically and representatively illustrated. The predictive device 124 includes an adaptive model 126, which may be similar in one or more respects to the adaptive models 74, 106, 114, 118, 122 described above. Preferably, in the predictive device 124 the adaptive model 126 includes a neural network, but other types of adaptive models could be used in keeping with the principles of the invention.

In the above descriptions of the various adaptive models 74, 106, 114, 118, tapped delay lines 78, 108, 110 have been described as being useful in the training, estimating and/or predicting modes of the neural networks used in the models. As discussed, tapped delay lines permit past measurements, estimates and predictions to be used to enhance estimates and predictions output by the neural networks.

However, it may not be desirable or practical to input all past measurements, estimates and/or predictions to a neural network. Instead, informed selection of which past measurements, estimates and/or predictions to input to a neural network may be used to improve efficiency and speed in training the neural network, and in using the trained neural network to estimate or predict certain variables.

In the example depicted in FIG. 10, it is desired to predict a future PGR at time index n+t. In addition, it is assumed that at least three variables significantly affect future PGR—injection flow rate IR, bottom hole pressure BHP and choke position CP. These variables IR, BHP, CP are input to the neural network along with respective tapped delay lines 128, 130, 132.

It should be understood that other variables could be input to the neural network. For example, the choke Cv (as well as the choke position CP) could be input to the neural network. Any variable which may significantly affect the neural network output (along with associated tapped delay line) may be input to the neural network. The choke Cv may be particularly useful as an input when, in underbalanced or managed pressure drilling, it is desired to accurately maintain the bottom hole pressure BHP at a specific value (such as, between pore pressure and fracture pressure of the zone being penetrated).

In the FIG. 10 example, a complete circulation of fluid through the wellbore 12 (from the time of injection into the wellbore via the standpipe 76 to the time of exiting the wellbore below the RCD 26) takes approximately thirty minutes. Thus, a change in the injection rate IR is assumed to most significantly affect the produced gas rate PGR thirty minutes after the change is made. Similarly, since bottom hole pressure BHP is measured at the bottom of the wellbore 12 (half of the circulation distance through the wellbore), it is assumed that the produced gas rate PGR is most significantly influenced by BHP measurements made fifteen minutes prior to the predicted PGR. The choke position CP is assumed to have an almost immediate effect on produced gas rate PGR; perhaps approximately one minute would separate a choke position CP change and a resulting change in PGR as measured at the flowmeter 80.

Since these are merely assumptions and approximations, there is some uncertainty associated with each of these. In this example, the uncertainty associated with the influence of the injection rate IR on the produced gas rate PGR may be +/− five minutes, the uncertainty associated with the influence of the bottom hole pressure BHP on the PGR may be +/− three minutes, and the uncertainty associated with the influence of the choke position CP on the PGR may be +/− one minute.

Note that the tapped delay line 128 associated with the injection rate IR input is "centered" with the IR at a time index of n+t minus thirty minutes (thirty minutes prior to the time index n+t of the desired predicted variable PGR). Additional inputs in the tapped delay line 128 are provided up to n+t minus thirty minutes and minus the uncertainty u for this variable of five minutes. Additional inputs in the tapped delay line 128 are also provided up to n+t minus thirty minutes and plus the uncertainty u for this variable of five minutes. Thus, the time indices of the IR inputs in the tapped delay line would range from n+t−35 to n+t−25. Any number of inputs between these limits, including the one in the center at time index n+t−30, may also be used.

Similarly, the tapped delay line 130 associated with the bottom hole pressure BHP input is "centered" with the BHP at a time index of n+t minus fifteen minutes (fifteen minutes prior to the time index n+t of the desired predicted variable PGR). Additional inputs in the tapped delay line 130 are provided up to n+t minus fifteen minutes and minus the uncertainty u for this variable of three minutes. Additional inputs in the tapped delay line 130 are also provided up to n+t minus fifteen minutes and plus the uncertainty u for this variable of three minutes. Thus, the time indices of the BHP inputs in the tapped delay line 130 would range from n+t−18 to n+t−12. Any number of inputs between these limits, including the one in the center at time index n+t−15, may also be used.

The tapped delay line 132 associated with the choke position CP input is "centered" with the CP at a time index of n+t minus one minute (one minute prior to the time index n+t of the desired predicted variable PGR). Additional inputs in the tapped delay line 132 are provided up to n+t minus one minute and minus the uncertainty u for this variable of one minute. Additional inputs in the tapped delay line 132 are also provided up to n+t minus one minute and plus the uncertainty u for this variable of one minute. Thus, the time indices of the CP inputs in the tapped delay line 132 would range from n+t−2 to n+t. Any number of inputs between these limits, including the one in the center at time index n+t−1, may also be used.

It should be clearly understood that the time values discussed above are merely examples. The time values will necessarily depend on actual circumstances encountered in each individual situation. For example, circulation time may not be thirty minutes in a given situation.

Figure 11:
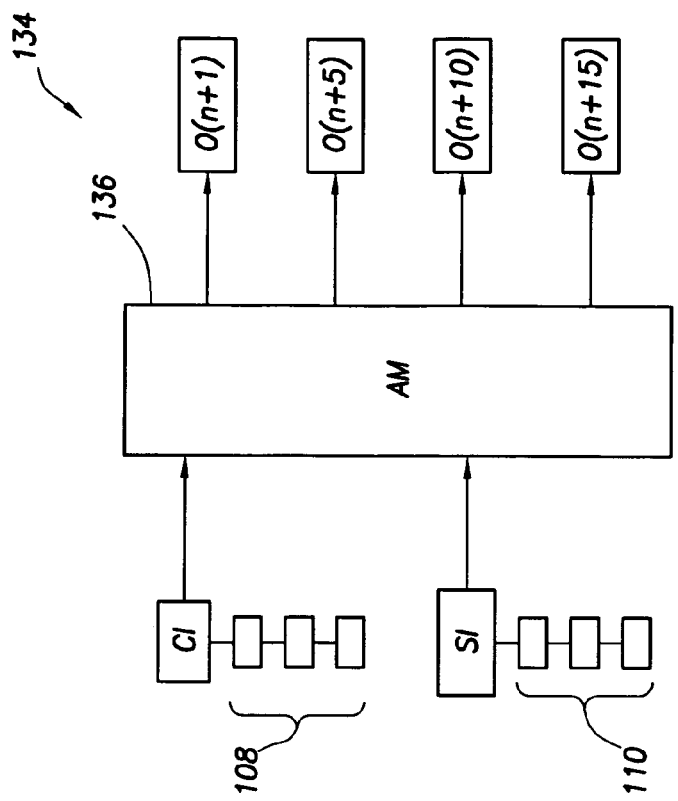

Referring additionally now to FIG. 11, another predictive device 134 which may be used in the system 10 is representatively and schematically illustrated. The predictive device 134 includes an adaptive model 136, which may be similar in one or more respects to the adaptive models 74, 106, 114, 126 described above. Preferably, in the predictive device 134 the adaptive model 136 includes a neural network, but other types of adaptive models could be used in keeping with the principles of the invention.

The neural network is trained using the input variables CI and SI. In addition, the tapped delay lines 108, 110 are input to the neural network. Once trained, the neural network outputs a prediction of variables O at multiple future time indices n+1, n+5, n+10 and n+15. The predicted variables O at the various future time indices may also be input to the neural network, along with associated tapped delay lines, if desired.

It will be appreciated that the farther in the future a prediction is made, the more potential error in the prediction. Thus, it may be useful for an operator to be provided with a relatively accurate near-future prediction of variables O, as well as successively less accurate predictions at respectively more distant times in the future. For example, a more accurate near-future prediction could be used to determine how to adjust control inputs CI (such as choke position) which produce relatively quick response in certain variables (such as produced gas rate or produced liquid rate), and a less accurate long term prediction could be used to determine how to adjust system inputs SI (such as injection fluid density) which produce relatively slow response in other variables (such as bottom hole pressure).

Figure 12:
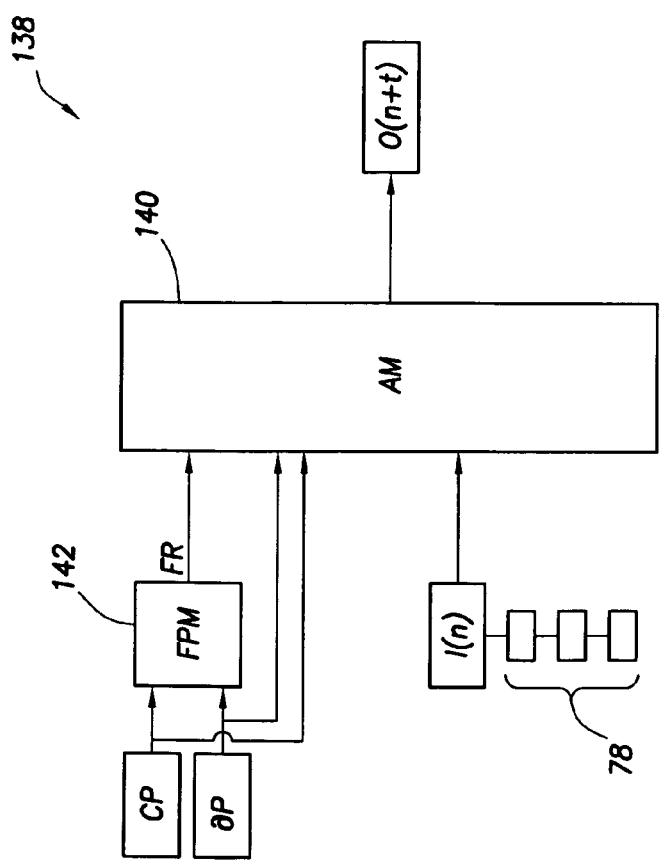

Referring additionally now to FIG. 12, another predictive device 138 which may be used in the system 10 is representatively and schematically illustrated. The predictive device 138 includes an adaptive model 140, which may be similar in one or more respects to the adaptive models 74, 106, 114, 126, 136 described above. Preferably, in the predictive device 138 the adaptive model 140 includes a neural network, but other types of adaptive models could be used in keeping with the principles of the invention.

The neural network is trained using the drilling operation variables I at time index n and other time indices using associated tapped delay line 78. In addition, a first principle model 142 is used between the adaptive model 140 and certain variable inputs—choke position CP and pressure differential $\partial P$ across the choke 34. An output of the first principle model 142 (flow rate FR through the choke 34) is used as one of the inputs to the neural network. The choke position CP and pressure differential $\partial P$ may also be input to the neural network.

In this example, the first principle model 142 is a known relationship or model of the interaction between choke position CP, pressure differential $\partial P$ and flow rate FR through the choke 34. Such a first principle model may, for example, be provided by the manufacturer of the choke 34. As another example, the choke manufacturer could provide a graph, function or other representation of the flow coefficient Cv versus choke position CP, etc. The use of such first principle models may aid in more efficiently and quickly training the neural network (e.g., by more rapidly producing convergence in the training process), and more accurately predicting future variables P.

Figure 13:
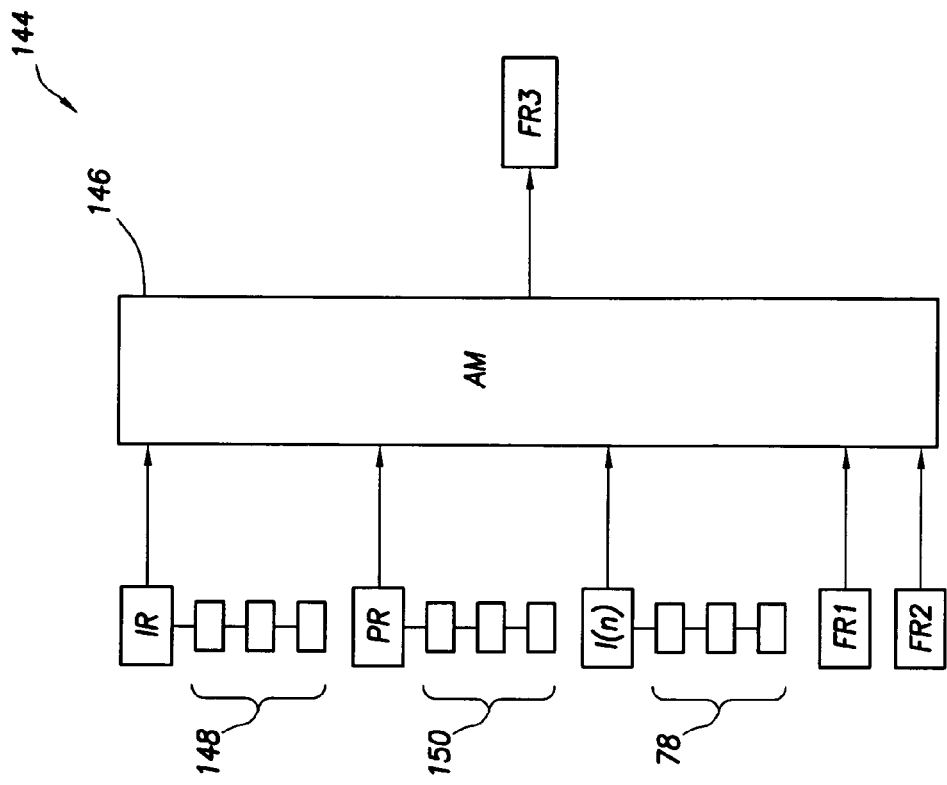

Referring additionally now to FIG. 13, another predictive device 144 which may be used in the system 10 is representatively and schematically illustrated. The predictive device 144 includes an adaptive model 146, which may be similar in one or more respects to the adaptive models 74, 106, 114, 126, 136, 140 described above. Preferably, in the predictive device 144 the adaptive model 146 includes a neural network, but other types of adaptive models could be used in keeping with the principles of the invention.

The predictive device 144 is particularly useful in predicting a flow rate FR3 between the wellbore 12 and the zone 66 being penetrated by the drill string 14 in the configuration of the system 10 depicted in FIG. 3. As described above, this is a complex problem due in substantial part to the existence of the other zones 56, 64 in communication with the wellbore 12. However, the predictive device 144 permits these complicating factors to be accounted for in training the neural network of the adaptive model 146.

The neural network is trained using the drilling operation variables I at time index n and prior time indices using tapped delay line 78. The variables I can include measurements or other determinations of characteristics (such as permeability, pore pressure, etc.) for the previously penetrated zones 56, 64. These characteristics of the zones 56, 64 may have been determined while each of the zones was being penetrated by the drill string 14.

In addition, specifically depicted in FIG. 13 are inputs of the injection rate IR and production rate PR, with associated respective tapped delay lines 148, 150 for each of these variables. Also input to the neural network are the flow rate FR1 between the wellbore 12 and the zone 56, and the flow rate FR2 between the wellbore and the zone 64. These flow rates FR1, FR2 may be generated from a first principle model which, given the permeability of each zone 56, 64, the hydrostatic and applied pressures in the wellbore 12 at each zone, pore pressure in each zone, etc., can determine the flow rate between the respective zones and the wellbore. The FR1 and FR2 inputs could be provided with associated respective tapped delay lines if desired.

Once trained, the adaptive model 146 can predict the flow rate FR3 for the zone 66 being penetrated. Using another first principle model, given the flow rate FR3 and the bottom hole pressure BHP, etc., permeability of the zone 66 may be determined. A change in permeability may be conveniently detected using the predictive device 144 as the zone 66 is being penetrated. In this manner, a relationship between permeability and depth along the wellbore 12 may be provided for the zone 66, as well as for the other zones 56, 64.

Figure 14:
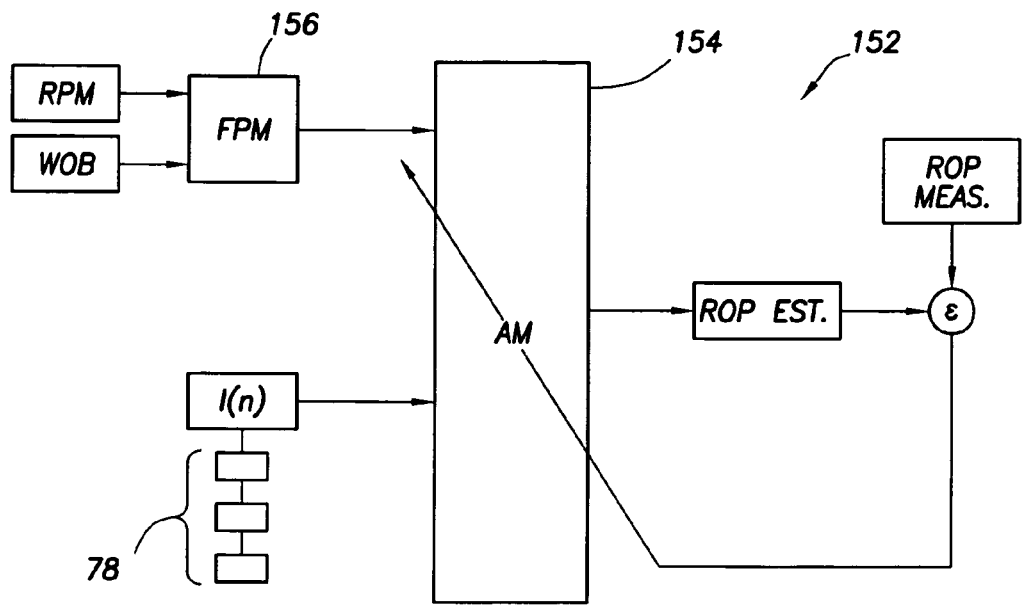

Referring additionally now to FIG. 14, another predictive device 152 which may be used in the system 10 is representatively and schematically illustrated. The predictive device 152 includes an adaptive model 154 which may be similar in one or more respects to the adaptive models 74, 106, 114, 126, 136 described above. Preferably, in the predictive device 152 the adaptive model 154 includes a neural network, but other types of adaptive models could be used in keeping with the principles of the invention.

The neural network is trained using the drilling operation variables I with associated tapped delay line 78. In addition, the rotational speed RPM of the bit 16 and the weight on the bit WOB are input to a first principle model 156. The RPM and WOB variables may also be input directly to the neural network as depicted for the CP and $\partial P$ variables in FIG. 12.

Once trained, the neural network outputs an estimate of the rate of penetration ROP. It will be appreciated that rate of penetration ROP is a drilling operation variable which may be directly measured over time, for example, by monitoring the advancement of the drill string 14 into the wellbore 12. However, the use of the adaptive model 154 allows an estimate of the rate of penetration ROP to be conveniently produced at any time, and further allows a change in ROP in response to changed drilling operation variables (including RPM and WOB) to be predicted.

When actual measurements of the rate of penetration are made or sensed, these actual measurements (depicted as ROP meas. in FIG. 14) are compared to the estimated rate of penetration (depicted as ROP est. in FIG. 14), and any error or discrepancy (depicted as $\epsilon$ in FIG. 14) is used to adjust the neural network, in order to improve the accuracy of future estimates. The ROP est. may also be input to the neural network, along with a tapped delay line if desired, as depicted for the estimated bottom hole pressure BHP est. in FIG. 7.

The ROP est. output by the adaptive model 154 can also be used in any of the other predictive devices described herein where the ROP is used as an input to an adaptive model, but a direct measurement of ROP is not continuously available. In addition, although the predictive device 152 is described above as being used to estimate ROP, any of the other drilling operation variables described herein could also or instead be estimated in keeping with the principles of the invention using similar techniques.

Figure 15:
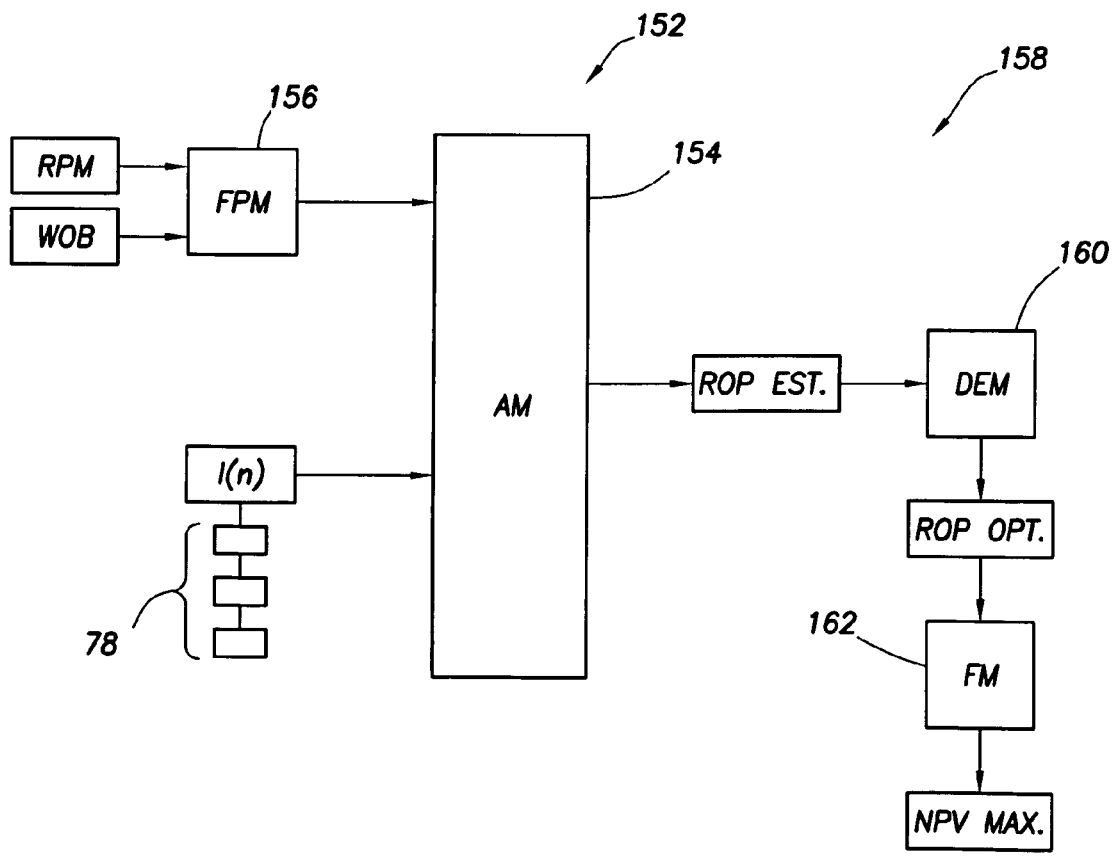

Referring additionally now to FIG. 15, the predictive device 152 is representatively illustrated as part of a system 158 in which the rate of penetration ROP is optimized and/or a net present value of the well is maximized. It will be appreciated that, once the neural network of the adaptive model 154 is trained, the predictive device 152 as depicted in FIG. 14 could be used to determine which combination of values of the variables I (including RPM and WOB) would produce a maximum ROP est. However, it will also be appreciated that maximum ROP is not always the most desirable result, since maximum ROP could cause increases in expenses (due, for example, to increased bit wear, additional trips of the drill string to change bits, etc.). Thus, what is most desirable is a rate of penetration ROP which is optimized for the unique circumstances of the drilling environment.

As depicted in FIG. 15, the output (ROP est.) of the adaptive model 154 is input to a drilling economics model 160. Although not shown in FIG. 15, other drilling operation variables I may also be input to the drilling economics model 160.

The drilling economics model 160 may be an adaptive model and may include a neural network, fuzzy logic, a genetic algorithm, an artificial intelligence device, a first principle model, or any other type of adaptive model, and any combination of these. The drilling economics model 160 may include a floating point processing device. The drilling economics model 160 may perform a regression analysis, utilize a nonlinear function which generalizes for real systems, utilize granular computing and/or perform regression on a nonlinear function.

An output of the drilling economics model 160 is input to a financial model 162. The drilling economics model 160 and the financial model 162 cooperate, with the drilling economics model being specifically tailored to the specific drilling operations, and the financial model accounting for overall financial aspects (such as the time value of money, cost of credit, predicted rates of return, costs of resources, production value, etc.). Utilizing optimization techniques known to those skilled in the art, the drilling economics model 160 outputs a rate of penetration which is optimized for the economics of the particular circumstances of the drilling operation (indicated in FIG. 15 as ROP opt.).

For example, derivatives of the ROP est. with respect to the "weights" in the neural network of the adaptive model 154 could be used in an optimization process in which a cost function is minimized. The financial model 162 outputs a maximized net present value of the well (indicated in FIG. 15 as NPV max.).

Note that it is not necessary for the financial model 162 to be used in the system 158, since the drilling economics model 160 could be used to optimize the rate of penetration without use of the financial model.

Figure 16:
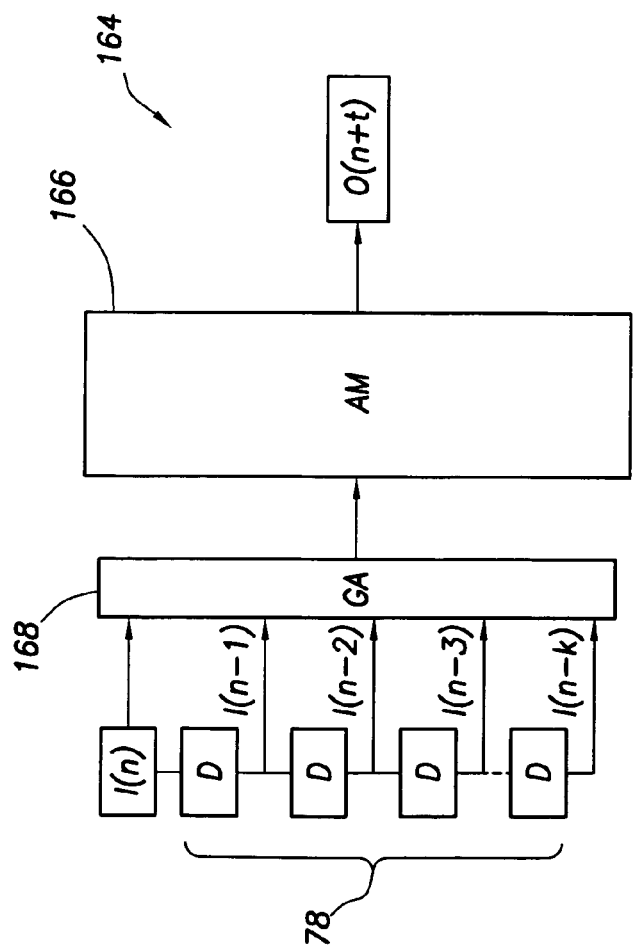

Referring additionally now to FIG. 16, another predictive device 164 which may be used in the system 10 is representatively and schematically illustrated. The predictive device 164 includes an adaptive model 166 which may be similar in one or more respects to the adaptive models 74, 106, 114, 126, 136 described above. Preferably, in the predictive device 164 the adaptive model 166 includes a neural network, but other types of adaptive models could be used in keeping with the principles of the invention.

The neural network is trained using the drilling operation variables I, with associated tapped delay line 78. Once trained, the neural network outputs a prediction of variables O at future time index n+t. The predicted variables O at the future time index n+t may also be input to the neural network, along with associated tapped delay lines if desired, as described above.

The predictive device 164 as depicted in FIG. 16 includes a genetic algorithm 168. The genetic algorithm 168 is used to select which of the variables I are input to the adaptive model, as well as the number of inputs, delays between inputs and "centering" of the tapped delay line 78. As discussed above in the description of the predictive device 124 depicted in FIG. 10, the efficiency and speed of training and utilizing the adaptive model 166 are improved if the inputs to the neural network are limited to those which have a substantial effect on the output of the neural network.

Figure 17:
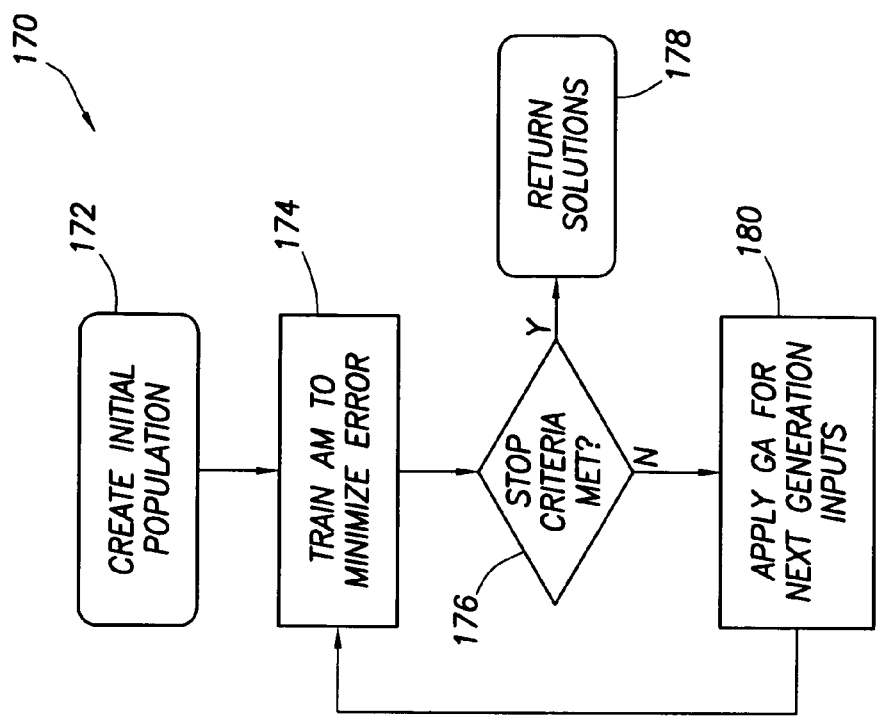

One problem is how to select which inputs are to be used. The predictive device 164 uses the genetic algorithm 168 for this purpose. A process 170 carried out with the genetic algorithm 168 is representatively and schematically illustrated in FIG. 17, in flow chart form.

Initially, in step 172 an initial population is created. This initial population includes selected drilling operation variables, with associated tapped delay lines, including selected delays, length and centering of the tapped delay lines.

In step 174, the neural network of the adaptive model 166 is trained using the selected inputs and tapped delay lines. According to conventional neural network training procedures, error in the output of the neural network is minimized in the training step 174 by appropriately adjusting terms or "weights" in the neural network.

If the error produced in the training step 174 is sufficiently small, so that a selected stop criteria is met in step 176, then a solution is returned in step 178. The solution is the set of drilling variable inputs and associated tapped delay lines which, when used to train the neural network, produce an acceptably small error.

If the error produced in the training step 174 is not sufficiently small, then in step 180 the genetic algorithm 168 is used to generate a next generation set of drilling variable inputs and associated tapped delay lines. As will be appreciated by those skilled in the art, the genetic algorithm 168 produces the next generation through a process of selection, crossover and mutation.

The next generation set of drilling variable inputs and associated tapped delay lines is then used to train the neural network again in step 174. This process of generating next generation sets of inputs and training the neural network is repeated until the stop criteria is met in step 176 and a solution is returned in step 178.

Once trained using the process 170, the selected drilling variable inputs and associated tapped delay lines of the solution returned in step 176 are used in the predictive device 164 to predict the future drilling operation variables O at the future time index n+t.

It may now be fully appreciated that the principles of the invention provide the system 10 with associated well control methods in which drilling operation variables (such as a change in flow between the wellbore 12 and the reservoir 60) may be readily predicted prior to the change occurring. The prediction may be made during drilling operations, so that the change which occurs during drilling operations can be conveniently predicted. A change in flow between the wellbore and the reservoir may occur after the prediction is made.

The change in flow may be, for example, an increased rate of fluid flow from the reservoir into the wellbore. Alternatively, the change in flow may be an increased rate of flow from the wellbore to the reservoir. The change in flow could result from a change in bottom hole pressure.

The predicting step may be performed by a predictive device. The predictive device may include a neural network, an artificial intelligence device, a floating point processing device, an adaptive model, a nonlinear function which generalizes for real systems and/or a genetic algorithm. The predictive device may perform a regression analysis, perform regression on a nonlinear function and may utilize granular computing. An output of a first principle model may be input to the adaptive model.

Terms or "weights" in the predictive device may be adjusted based on derivatives of output of the predictive device with respect to the terms. These derivatives would typically be used in an optimization process in which a cost function is either minimized or maximized.

The predictive device may be trained by inputting to the predictive device data obtained during the drilling operation. In addition, or instead, the predictive device may be trained by inputting to the predictive device data obtained while drilling at least one prior wellbore. The training may include inputting to the predictive device data indicative of past errors in predictions produced by the predictive device.

The drilling operation may be performed with an underbalanced condition in the wellbore. Alternatively, or in addition, a balanced condition and/or an overbalanced condition may exist in the wellbore.

The drilling operation may be performed while fluid flows from the reservoir into the wellbore. The drilling operation may include circulating fluid from the reservoir to a surface location.

As described above, the well control method could include the steps of: sensing a drilling operation variable while drilling a wellbore, thereby generating sensed variables; intermittently transmitting the sensed variables; and training a predictive device, using the sensed variables, to predict a value of the drilling operation variable occurring between transmissions of the sensed variables.

Furthermore, the well control method could include the steps of: sensing at least one first drilling operation variable while drilling a wellbore, thereby generating a first set of sensed variables; sensing at least one second drilling operation variable while drilling the wellbore, thereby generating a second set of sensed variables; and training a predictive device, using the first and second sensed variable sets, to predict the second drilling operation variable at a selected time.

A well control method practiced according to the principles of the invention could also include the steps of: sensing at least one first drilling operation variable while drilling one wellbore, thereby generating a first set of sensed variables; sensing at least one second drilling operation variable while drilling another wellbore, thereby generating a second set of sensed variables; and training a predictive device, using the first and second sensed variable sets, to predict the second drilling operation variable at a selected time.

The trained predictive device may be utilized to predict the second drilling operation variable at the selected time when the second sensed variable is unavailable. The selected time may be a time when the first sensed variable is available, but the second sensed variable is unavailable.

Of course, a person skilled in the art would, upon a careful consideration of the above description of representative embodiments of the invention, readily appreciate that many modifications, additions, substitutions, deletions, and other changes may be made to these specific embodiments, and such changes are within the scope of the principles of the present invention. Accordingly, the foregoing detailed description is to be clearly understood as being given by way of illustration and example only, the spirit and scope of the present invention being limited solely by the appended claims and their equivalents.

What is claimed is:

1. A well control method, comprising the steps of:
   drilling a wellbore, thereby elongating the wellbore; and
   predicting a change in flow between the wellbore and a reservoir prior to the change occurring, the predicting step being performed during the drilling step, and the change in flow occurring while elongating the wellbore.

2. The method of claim 1, wherein the change in flow is an increased rate of fluid flow from the reservoir into the wellbore.

3. The method of claim 1, wherein the predicting step is performed by a predictive device.

4. The method of claim 3, wherein the predictive device includes a neural network.

5. The method of claim 3, wherein the predictive device includes an artificial intelligence device.

6. The method of claim 3, wherein the predictive device includes a genetic algorithm.

7. The method of claim 3, wherein the predictive device performs a regression analysis.

8. The method of claim 3, wherein the predictive device utilizes granular computing.

9. The method of claim 3, wherein the predictive device includes an adaptive model.

10. The method of claim 9, wherein an output of a first principle model is input to the adaptive model.

11. The method of claim 3, wherein the predictive device includes a nonlinear function which generalizes for real systems.

12. The method of claim 3, wherein the predictive device includes a floating point processing device.

13. The method of claim 3, wherein the predicting step includes adjusting terms in the predictive device based on derivatives of output of the predictive device with respect to the terms.

14. The method of claim 3, further comprising the step of training the predictive device.

15. The method of claim 14, wherein the training step further comprises inputting to the predictive device data obtained during the drilling step.

16. The method of claim 14, wherein the training step further comprises inputting to the predictive device data obtained while drilling at least one prior wellbore.

17. The method of claim 14, wherein the training step further comprises inputting to the predictive device data indicative of past errors in predictions produced by the predictive device.

18. The method of claim 1, wherein the drilling step is performed with an underbalanced condition in the wellbore.

19. The method of claim 1, wherein the drilling step is performed with a balanced condition in the wellbore.

20. The method of claim 1, wherein the drilling step is performed with an overbalanced condition in the wellbore.

21. The method of claim 1, wherein the drilling step is performed while fluid flows from the reservoir into the wellbore.

22. The method of claim 1, wherein the drilling step includes circulating fluid from the reservoir to a surface location.

23. The method of claim 1, wherein the change in flow between the wellbore and the reservoir occurs after the predicting step.

24. The method of claim 1, wherein the change in flow is an increased rate of flow from the wellbore to the reservoir.

25. The method of claim 1, wherein the predicting step further comprises predicting a change in bottom hole pressure during the drilling step.

26. The method of claim 1, wherein the predicting step includes performing regression on a nonlinear function.

27. A well control method, comprising the steps of:
    sensing a drilling operation variable while elongating a wellbore, thereby generating sensed variables; and
    training a predictive device, using the sensed variables, to predict a value of the drilling operation variables,
    wherein the drilling operation variable is a change in flow rate between a reservoir and the wellbore.

28. The method of claim 27, wherein the sensing step is performed in the wellbore.

29. The method of claim 27, wherein the sensing step is performed at a surface location.

30. The method of claim 27, wherein the predictive device includes a neural network.

31. The method of claim 27, wherein the predictive device includes an artificial intelligence device.

32. The method of claim 27, wherein the predictive device includes a genetic algorithm.

33. The method of claim 27, wherein the predictive device performs a regression analysis.

34. The method of claim 27, wherein the predictive device utilizes granular computing.

35. The method of claim 27, wherein the predictive device includes an adaptive model.

36. The method of claim 35, wherein an output of a first principle model is input to the adaptive model.

37. The method of claim 27, wherein the predictive device includes a nonlinear function which generalizes for real systems.

38. The method of claim 27, wherein the predictive device includes a floating point processing device.

39. The method of claim 27, wherein the training step includes adjusting terms in the predictive device based on derivatives of output of the predictive device with respect to the terms.

40. The method of claim 27, wherein the training step further comprises inputting to the predictive device data obtained while drilling at least one prior wellbore.

41. The method of claim 27, wherein the training step further comprises inputting to the predictive device data indicative of past errors in predictions produced by the predictive device.

42. The method of claim 27, wherein the drilling operation variable is a rate of fluid flow between a reservoir and the wellbore.

43. The method of claim 27, wherein drilling the wellbore is performed in an underbalanced condition.

44. The method of claim 27, wherein drilling the wellbore is performed in a balanced condition.

45. The method of claim 27, wherein drilling the wellbore is performed in an overbalanced condition.

46. The method of claim 27, wherein the drilling operation variable is at least one of pressure, pressure differential, temperature, flow rate, produced gas rate, produced liquid rate, produced solids rate, true vertical depth, rate of penetration, bottom hole pressure, and fluid properties.

47. A well control method, comprising the steps of:
sensing at least one first drilling operation variable while elongating a wellbore, thereby generating first sensed variables;
sensing at least one second drilling operation variable while elongating the wellbore, thereby generating second sensed variables; and
training a predictive device, using the first and second sensed variables, to predict the second drilling operation variable at a selected time,
wherein the second drilling operation variable is a change in flow rate between a reservoir and the wellbore.

48. The method of claim 47, further comprising the step of utilizing the trained predictive device to predict the second drilling operation variable at the selected time when the second sensed variable is unavailable.

49. The method of claim 47, wherein the selected time is when the first sensed variable is available, but the second sensed variable is unavailable.

50. The method of claim 47, wherein the second sensed variable is a rate of fluid flow between the wellbore and a reservoir.

51. The method of claim 47, wherein the second sensed variable is at least one of pressure, pressure differential, surface temperature, downhole temperature, multiphase flow rate, and single phase flow rate.

52. The method of claim 47, wherein the second sensed variable is at least one of rate of penetration and bottom hole pressure.

53. The method of claim 47, wherein the predictive device includes a neural network.

54. The method of claim 47, wherein the predictive device includes an artificial intelligence device.

55. The method of claim 47, wherein the predictive device includes a genetic algorithm.

56. The method of claim 47, wherein the predictive device performs a regression analysis.

57. The method of claim 47, wherein the predictive device utilizes granular computing.

58. The method of claim 47, wherein the predictive device includes an adaptive model.

59. The method of claim 58, wherein an output of a first principle model is input to the adaptive model.

60. The method of claim 47, wherein the predictive device includes a nonlinear function which generalizes for real systems.

61. The method of claim 47, wherein the predictive device includes a floating point processing device.

62. The method of claim 47, wherein the training step includes adjusting terms in the predictive device based on derivatives of output of the predictive device with respect to the terms.

63. The method of claim 47, wherein the training step further comprises inputting to the predictive device data obtained while drilling at least one prior wellbore.

64. The method of claim 47, wherein the training step further comprises inputting to the predictive device data indicative of past errors in predictions produced by the predictive device.

65. The method of claim 47, wherein the second drilling operation variable is a rate of fluid flow between a reservoir and the wellbore.

66. The method of claim 47, wherein drilling the wellbore is performed in an underbalanced condition.

67. The method of claim 47, wherein drilling the wellbore is performed in a balanced condition.

68. The method of claim 47, wherein drilling the wellbore is performed in an overbalanced condition.

69. The method of claim 47, wherein the selected time is a time after the training step is performed.

70. The method of claim 47, wherein a flow coefficient Cv of a choke is used in the training step as an input to train the predictive device.

71. A well control method, comprising the steps of:
sensing at least one first drilling operation variable while elongating a first wellbore, thereby generating first sensed variables;
sensing at least one second drilling operation variable while elongating a second wellbore, thereby generating second sensed variables; and
training a predictive device, using the first and second sensed variables, to predict the second drilling operation variable at a selected time,
wherein the first drilling operation variable is a change in flow rate between a reservoir and the first wellbore.

72. The method of claim 71, further comprising the step of utilizing the trained predictive device to predict the second drilling operation variable at the selected time when the second sensed variable is unavailable.

73. The method of claim 71, wherein the selected time is when the first sensed variable is available, but the second sensed variable is unavailable.

74. The method of claim 71, wherein the second sensed variable is a rate of fluid flow between the second wellbore and a reservoir.

75. The method of claim 71, wherein the second sensed variable is at least one of pressure, pressure differential, surface temperature, downhole temperature, multiphase flow rate, and single phase flow rate.

76. The method of claim 71, wherein the predictive device includes a neural network.

77. The method of claim 71, wherein the predictive device includes an artificial intelligence device.

78. The method of claim 71, wherein the predictive device includes a genetic algorithm.

79. The method of claim 71, wherein the predictive device performs a regression analysis.

80. The method of claim 71, wherein the predictive device utilizes granular computing.

81. The method of claim 71, wherein the predictive device includes an adaptive model.

82. The method of claim 81, wherein an output of a first principle model is input to the adaptive model.

83. The method of claim 71, wherein the predictive device includes a nonlinear function which generalizes for real systems.

84. The method of claim 71, wherein the predictive device includes a floating point processing device.

85. The method of claim 71, wherein the training step includes adjusting terms in the predictive device based on derivatives of output of the predictive device with respect to the terms.

86. The method of claim 71, wherein the training step further comprises inputting to the predictive device data indicative of past errors in predictions produced by the predictive device.

87. The method of claim 71, wherein the first drilling operation variable is a rate of fluid flow between a reservoir and the first wellbore.

88. The method of claim 71, wherein drilling the second wellbore is performed in an underbalanced condition.

89. The method of claim 71, wherein drilling the second wellbore is performed in a balanced condition.

90. The method of claim 71, wherein drilling the second wellbore is performed in an overbalanced condition.

91. The method of claim 71, wherein the first drilling operation variable is at least one of pressure, pressure differential, temperature, and flow rate.

92. The method of claim 71, wherein the selected time is a time after the training step is performed.

93. The method of claim 1, further comprising the step of varying a restriction to flow through a choke in response to the predicting step.

94. The method of claim 93, wherein the varying step alters the predicted change in flow.

95. The method of claim 27, further comprising the step of varying a restriction to flow through a choke based on the value predicted in the training step.

96. The method of claim 95, wherein the varying step alters the predicted value.

97. The method of claim 47, further comprising the step of varying a restriction to flow through a choke based on the second drilling operation variable predicted in the training step.

98. The method of claim 97, wherein the varying step alters the predicted second drilling operation variable.

99. The method of claim 71, further comprising the step of varying a restriction to flow through a choke based on the second drilling operation variable predicted in the training step.

100. The method of claim 99, wherein the varying step alters the predicted second drilling operation variable.

* * * * *

UNITED STATES PATENT AND TRADEMARK OFFICE
CERTIFICATE OF CORRECTION

PATENT NO. : 7,610,251 B2  Page 1 of 1
APPLICATION NO. : 11/333768
DATED : October 27, 2009
INVENTOR(S) : Shayegi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 371 days.

Signed and Sealed this

Twelfth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,610,251 B2
APPLICATION NO. : 11/333768
DATED : October 27, 2009
INVENTOR(S) : Sara Shayegi et al.

Page 1 of 1

It is certified that error appears in the above-identified patent and that said Letters Patent is hereby corrected as shown below:

Column 20, line 14, cancel the text beginning with "27. A well control method," to and ending "and the wellbore." in column 20, line 20, and insert the following claim:
--27. A well control method, comprising the steps of: sensing a drilling operation variable while elongating a wellbore, thereby generating sensed variables; intermittently transmitting the sensed variables; and training a predictive device, using the sensed variables, to predict a value of the drilling operation variable occurring between transmissions of the sensed variables, wherein the drilling operation variable is a change in flow rate between a reservoir and the wellbore.--

Signed and Sealed this
Twenty-seventh Day of September, 2011

David J. Kappos
*Director of the United States Patent and Trademark Office*